US012629891B2

(12) United States Patent
Siegl et al.

(10) Patent No.: US 12,629,891 B2
(45) Date of Patent: May 19, 2026

(54) METHOD OF MANUFACTURING AT LEAST A PART OF A SPORTS ARTICLE

(71) Applicant: adidas AG, Herzogenaurach (DE)

(72) Inventors: Christian Siegl, Zirndorf (DE); Jochen Suessmuth, Erlangen (DE); Jacques Perrault, Portland, OR (US); Derek Luther, Lake Oswego, OR (US); Andrew Schneider, Portland, OR (US); Dustin Kendrick, Portland, OR (US); Mark Henderson, Portland, OR (US)

(73) Assignee: adidas AG, Herzogenaurach (DE)

( * ) Notice: Subject to any disclaimer, the term of this patent is extended or adjusted under 35 U.S.C. 154(b) by 481 days.

(21) Appl. No.: 16/684,691

(22) Filed: Nov. 15, 2019

(65) Prior Publication Data

US 2020/0164582 A1     May 28, 2020

(30) Foreign Application Priority Data

Nov. 27, 2018    (DE) .......................... 102018220365.2

(51) Int. Cl.
*B29C 64/386*          (2017.01)
*A43B 13/00*          (2006.01)
(Continued)

(52) U.S. Cl.
CPC ............ *B29C 64/386* (2017.08); *A43B 13/00* (2013.01); *A43D 86/00* (2013.01); *B33Y 50/00* (2014.12);
(Continued)

(58) Field of Classification Search
None
See application file for complete search history.

(56) References Cited

U.S. PATENT DOCUMENTS

2015/0351493 A1     12/2015   Ashcroft et al.
2016/0242502 A1*     8/2016   Spanks ................ A43B 13/181

FOREIGN PATENT DOCUMENTS

CN          104573180 A  *  4/2015
JP       2005127181 A  *  5/2005    ................ F04B 1/12
(Continued)

OTHER PUBLICATIONS

Hidalgo, Implementation of Finite Element Analysis into the Athletic Shoe Design Process, 2004, Massachusetts Institute of Technology, pp. 1-32 (Year: 2004).*
(Continued)

*Primary Examiner* — Ryan F Pitaro
*Assistant Examiner* — Bernard E Cothran
(74) *Attorney, Agent, or Firm* — Kilpatrick Townsend & Stockton LLP

(57)          ABSTRACT

Described are methods of manufacturing at least part of a sports article. The method includes determining a set of physical parameters of the sports article, wherein the set including a first group and a second group. The method further includes determining a set of constraints for the first group of physical parameters, wherein the set of constraints is intended to achieve at least one objective function. Moreover, method further includes determining an optimum for the at least one objective function, which is determined by optimizing the second group of physical parameters and manufacturing the part of the sports article according to the set of constraints and the second group of optimal physical parameters.

14 Claims, 5 Drawing Sheets

(51) Int. Cl.

| | | |
|---|---|---|
| *A43D 86/00* | (2006.01) | |
| *B29L 31/50* | (2006.01) | |
| *B33Y 50/00* | (2015.01) | |
| *B33Y 80/00* | (2015.01) | |
| *G06F 30/23* | (2020.01) | |
| *G06F 113/10* | (2020.01) | |

(52) U.S. Cl.
CPC ........ *G06F 30/23* (2020.01); *B29L 2031/504* (2013.01); *B29L 2031/505* (2013.01); *B33Y 80/00* (2014.12); *G06F 2113/10* (2020.01)

(56) References Cited

FOREIGN PATENT DOCUMENTS

| WO | 2014100462 | 6/2014 | |
|---|---|---|---|
| WO | 2018045123 | 3/2018 | |
| WO | WO-2018129144 A1 * | 7/2018 | ............... A43B 1/00 |

OTHER PUBLICATIONS

Lucas, An Introduction to the Delaunay Triangulation, 2023, G.W. Lucas, pp. 1-6 (Year: 2023).*

Computer Hope, Voxel, 2023, Computer Hope, p. 1 (Year: 2023).*

Tang et al., Real Person Copying Shoe and Shoe Tree Method Method Based on Multi-angle Machine Vision Monocular (Translation), 2015, Chinese Patent Office, pp. 1-19 (Year: 2015).*

German Patent Application No. 102018220365.2, Office Action mailed Aug. 25, 2020, 16 pages (machine English translation provided).

European Patent Application No. 19210249.9, European Search Report mailed Apr. 17, 2020, 8 pages.

European Application No. 19210249.9, Office Action mailed on Nov. 10, 2021, 7 pages.

Anonymous, "Delaunay triangulation", Wikipedia, available at https://en.wikipedia.org/w/index.php?title= Delaunay_triangulation&oldid= 614036873, Jun. 23, 2014, 8 pages.

Anonymous, "Loyd's algorithm", Wikipedia, available at https://en.wikipedia.org/wiki/Lloyd's_algorithm, Jan. 29, 2021, 6 pages.

European Patent Application No. 19210249.9, Office Action mailed Mar. 2, 2021, 7 pages.

Lee et al., "Two Algorithms for Constructing a Delaunay Triangulation 1", International Journal of Information and Computer Sciences, Plenum Publishing Corporation, vol. 9, No. 1, XP001377595, Jan. 1, 1980, pp. 219-243.

European Patent Application No. 19210249.9, Office Action mailed Jun. 22, 2022, 5 pages.

Office Action, Chinese Patent Application No. 201911179662.9, Jan. 13, 2023, 15 pages.

* cited by examiner

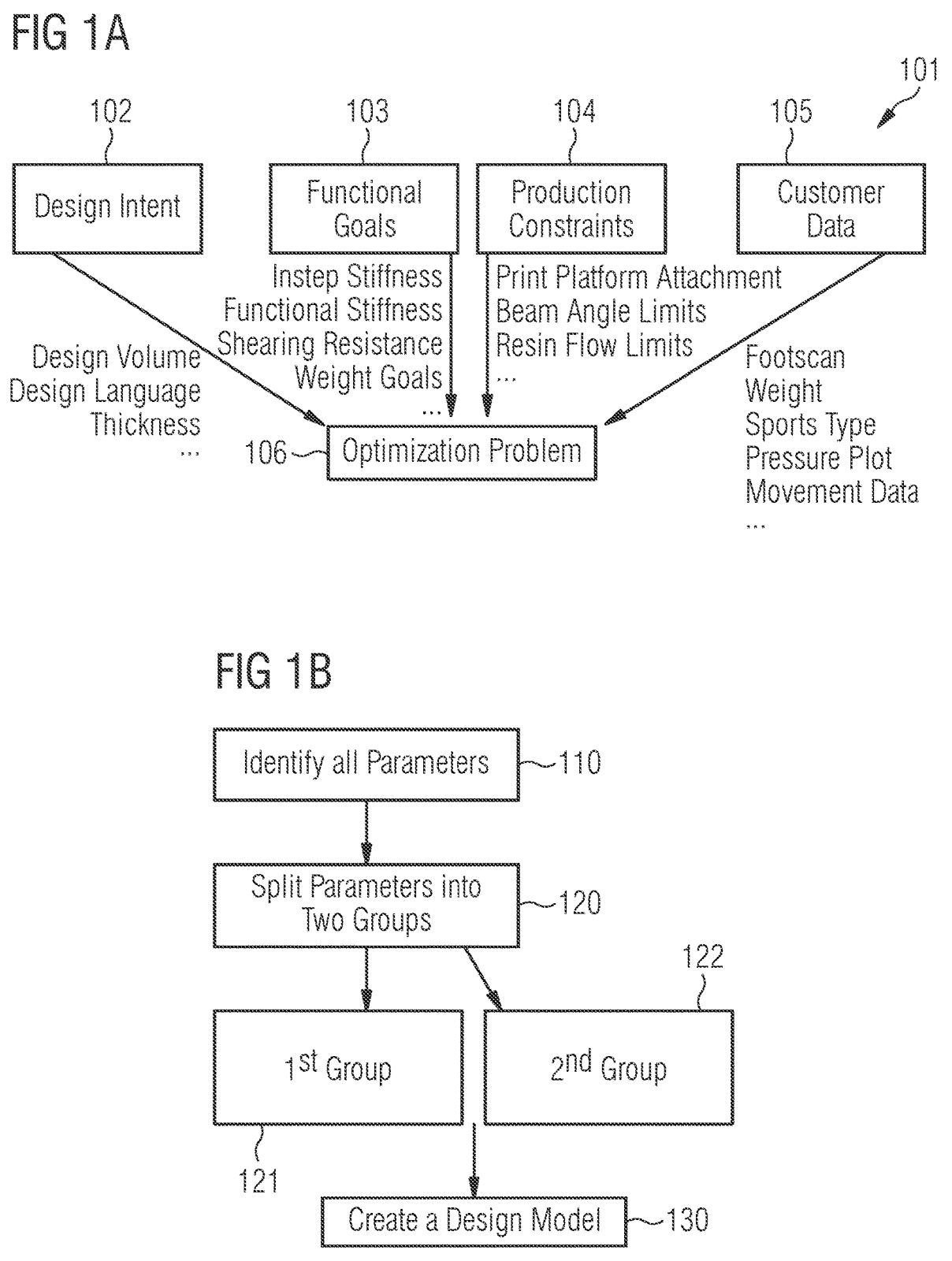

102
Design Intent

103
Functional Goals

104
Production Constraints

105
Customer Data

Design Volume
Design Language
Thickness
...

Instep Stiffness
Functional Stiffness
Shearing Resistance
Weight Goals
...

Print Platform Attachment
Beam Angle Limits
Resin Flow Limits
...

Footscan
Weight
Sports Type
Pressure Plot
Movement Data
...

106 — Optimization Problem

FIG 1B

Identify all Parameters — 110

Split Parameters into Two Groups — 120

1st Group

2nd Group — 122

121

Create a Design Model — 130

FIG 2A
FIG 2B
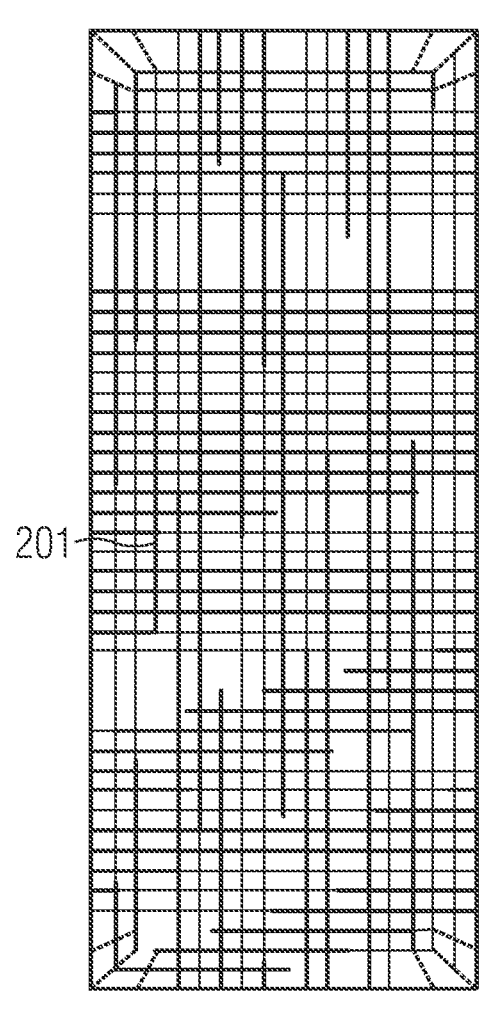
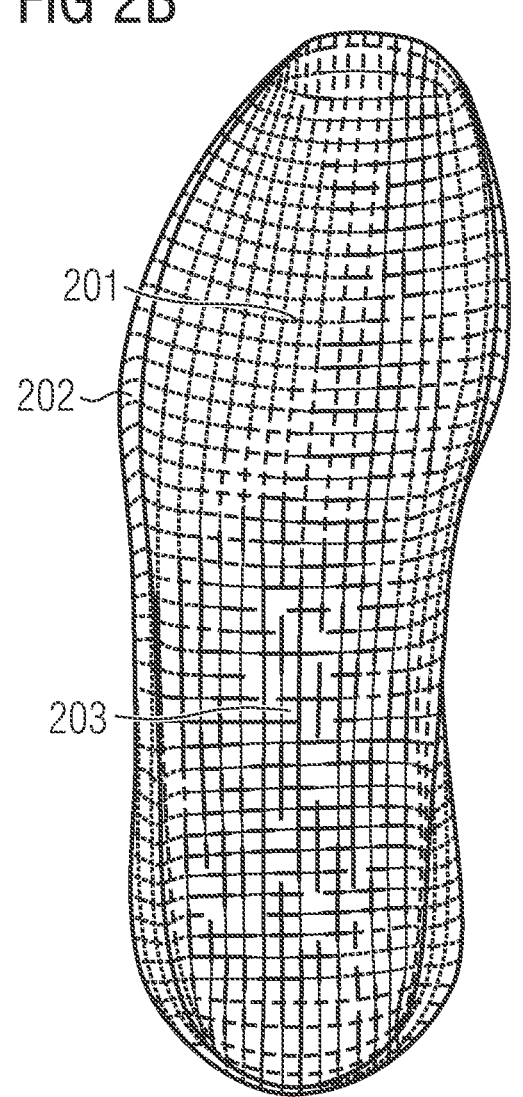

204

301

301

METHOD OF MANUFACTURING AT LEAST A PART OF A SPORTS ARTICLE

CROSS REFERENCE TO RELATED APPLICATION

This application is related to and claims priority benefits from German Patent Application No. DE 102018220365.2, filed on Nov. 27, 2018, entitled METHOD OF MANUFAC-TURING AT LEAST A PART OF A SPORTS ARTICLE ("the '365 application"). The '365 application is hereby incorporated herein in its entirety by this reference.

FIELD OF THE INVENTION

The present invention relates to a method of manufactur-ing at least a part of a sports article.

BACKGROUND

Typically, the design process of modern sports articles involves extensive simulations regarding their desired physical properties. Available tools for such simulation involve for example finite element methods (FEM). The physical properties analyzed in such simulations usually reflect the reaction of the sports article to the application of some force or torque. Examples include elasticity, stiffness, shearing resistance and bending stiffness. Even on modern computers, state-of-the art simulation techniques like FEM require significant run-times, often in the order of several hours, which makes it very expensive.

Modern production techniques like additive manufactur-ing (e.g. 3D-printing) and assembling of (possibly many) components by robots add to the complexity of the design process due to a significantly increased number of degrees of freedom. 3D-printed sports articles may be provided with a beam structure to save material and weight. In principle, each beam has a number of parameters like position, length, orientation, diameter, connectivity to other beams, etc. which are multiplied by the number of beams to arrive at a large number of parameters which must be fixed.

In addition, the properties of materials used in additive manufacturing processes are difficult to simulate due to non-linear properties, elasticity, buckling, contact to support platforms, etc. This adds the complexity and run-time of the required simulations.

This poses a challenge to the designer as he has to cope with a large number of parameters. In addition, given the run-time of the simulations, it is takes a very long time to arrive at an optimal configuration of all parameters.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Descrip-tion section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present inven-tion, a method of manufacturing at least part of a sports article comprises the steps of determining a set of physical parameters of the sports article, the set comprising a first group and a second group, determining a set of constraints for the first group of the physical parameters, wherein the at least one objective function is achievable via the set of constraints, determining an optimum for the at least one objective function, wherein the optimum is determined by optimizing the second group of physical parameters, and manufacturing the part of the sports article according to the set of constraints and the second group of optimal physical parameters.

In some embodiments, the step of determining the opti-mum of the at least one objective function may comprise a step of using an iterative process that estimates the optimal physical parameters of the second group by a set of succes-sive function evaluations of the at least one objective function.

In some embodiments, a first subset of the set of succes-sive function evaluations is based on at least one heuristic that provides estimates for the function evaluations. The heuristic may be based on a digital model of the part of the sports article and he digital may be based on the set of physical parameters. The digital model may include the step of providing a mesh structure comprising mesh cells, and deforming the mesh structure such that an outer boundary conforms to a shape of the part of the sports article.

The mesh structure may comprise a first plurality of mesh cells and the first plurality of mesh cells may comprise hexahedral cells. Moreover, the mesh structure may com-prise a second plurality of mesh cells, which may be different from the first plurality of mesh cells and/or may comprise tetrahedral cells. The first plurality of mesh cells may be surrounded at least in part by the second plurality of mesh cells. Each mesh cell may be populated with a lattice stencil that forms a portion of the part of the sports article to be manufactured.

In some embodiments, a second subset of the set of successive function evaluations is based on exact function evaluations, wherein the second subset of the successive function evaluations are performed after the first subset of successive function evaluations. The exact function evalu-ations may be obtained by a finite element analysis ("FEA"). The FEA may be based on a production file, wherein the production file is based on the digital model.

In some embodiments, the step of manufacturing the part of the sports article comprises using an additive manufac-turing method.

In some embodiments, the sports article is a shoe and the part is a midsole of the shoe. In further embodiments, the sports article is a shoe and the part is an upper of the shoe.

The step of manufacturing the part of the sports article may include providing a blank and placing at least one patch on the blank.

BRIEF DESCRIPTION OF THE DRAWINGS

In the following detailed description, embodiments of the invention are described referring to the following figures:

FIGS. 1A-1C are exemplary methods according to certain embodiments of the present invention.

FIG. 2A is a hexahedral mesh used to fill a midsole volume manufactured according to one of the methods described herein, according to certain embodiments of the present invention.

FIG. 2B is a midsole volume filled with the hexahedral mesh of FIG. 2A, according to certain embodiments of the present invention.

BRIEF DESCRIPTION

Figure 1C:
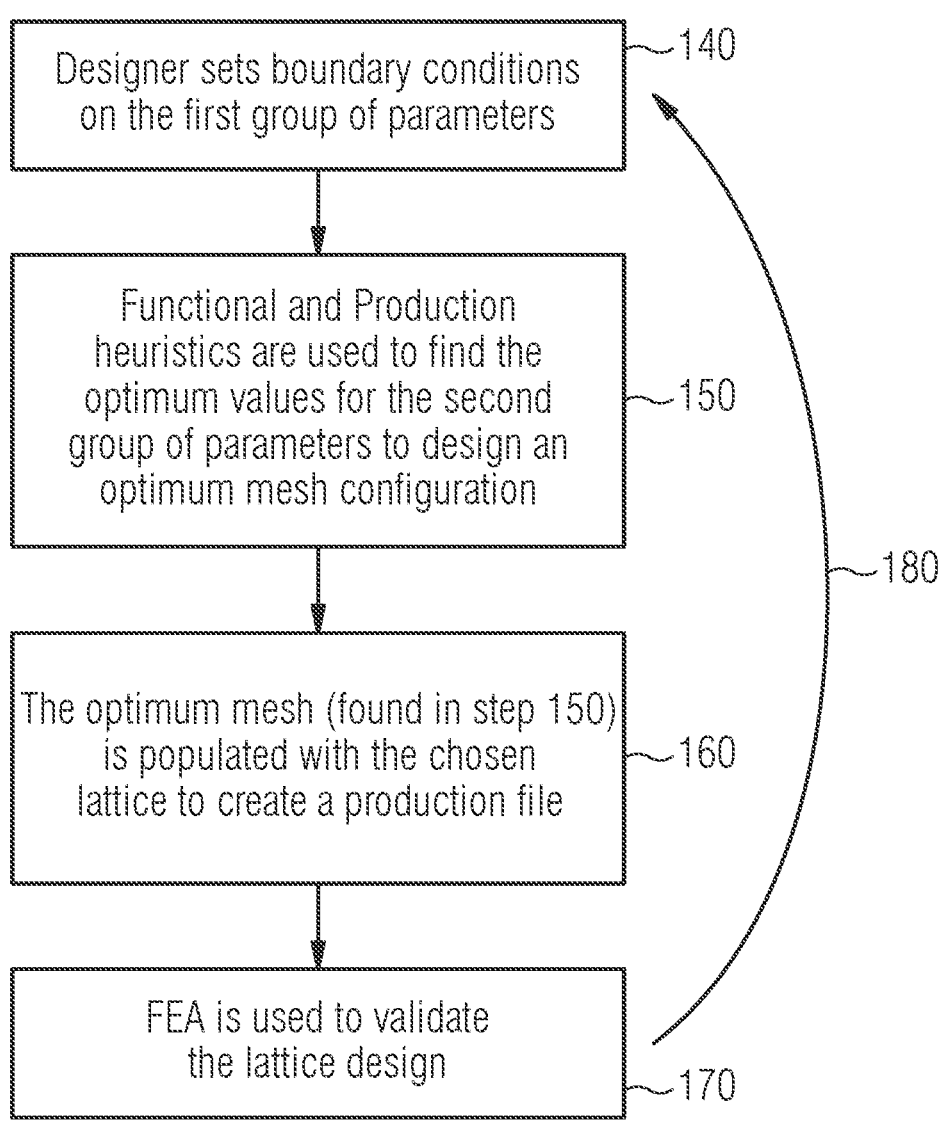

Therefore, it is the object of the present invention to provide a method of manufacturing at least a part of a sports article that is fast, exploits the possibilities of modern production techniques and supports the designer or engineer even if the part of the sports article is formed of many individual components.

This objective is met by a method of manufacturing at least a part of a sports article, comprising the steps: (a.) determining a set of physical parameters of the sports article, the set comprising a first group and a second group; (b.) determining a set of constraints for the first group of the physical parameters, wherein the set of constraints is intended to achieve at least one objective function; (c.) determining an optimum of the at least one objective function, wherein the optimum is determined by optimizing the second group of physical parameters; and (d.) manufacturing the part of the sports article according to the set of constraints and the second group of optimal physical parameters.

The physical parameters of the sports article are all the variables that may be considered when designing or engineering the sports article. In some embodiments, the available physical parameters are split into two groups. The first group of parameters may relate to basic properties of the sports article. Parameters in the first group may be set by the designer or engineer at the outset. When manufacturing a sports article by 3D-printing, which will be described in more detail herein, the parameters in the first group may, for example, include the lattice family to be used. They may also include a number of voxels into which the midsole volume is to be split. The first group of parameters may be chosen with a view to achieve the desired properties of the sports article(i.e. to achieve the objective function).

The second group of parameters may be those parameters that are optimized in a subsequent method step to meet certain goals. With reference to the 3D-printing, to be discussed in more detail, these parameters may include the number and position of cells which are used to discretize the volume of the sports article.

By splitting the physical parameters of the sports article into a first group that may be set by the designer or engineer and a second group that is optimized, the method, may significantly unburden the designer or engineer. The number of variables available for the designer or engineer to designate is reduced compared to if the designer had full control over all parameters. This reduction in variables that the designer or engineer can control reduces the complexity of the design process as there are fewer combinations of values to choose from. This reduced problem also opens the possibility to offer an intuitive and easy to use interface for designers, sports scientists, and engineers to voice their requirements.

What is left to the designer or engineer is to determine values, chosen with a view to achieve at least one objective function. Broadly, these requirements are, for example, chosen such that the sports article is visually pleasing from a design point of view, fulfills certain functional properties set by sports science, and is producible (at reasonable costs) and durable. The function values of the associated objective functions are typically physical properties of the sports article, such as stiffness, shearing resistance, weight, etc.

The at least one objective function is then optimized (i.e. an optimum is searched by varying the second group of physical parameters). In this way, an optimal sports article is obtained given the constraints initially set by the designer or engineer. As the number of parameters of the second group considered by this optimization step is smaller than the initial number of (all) physical parameters, the optimization step includes far fewer variations to be assessed, and therefore requires less run-time and is less expensive.

It is to be understood that the method according to the some embodiments, may be applied to at least a part of the sports article or to the entire sports article, i.e. the result of applying the method may be a part of a sports article or an entire sports article.

The step of determining an optimum of the at least one objective function may comprise the step of using an iterative process that estimates the optimal physical parameters of the second group by a set of successive function evaluations of the at least one objective function. Such an iterative process is particularly useful if the objective function cannot be derived analytically, which is regularly the case. In this case, the iterative process approaches the optimum by "probing" the objective function at different points.

The iterative process may start by analyzing a starting point, or starting geometry, for a given property, then a second point/geometry may be analyzed for the same property and the process may identify the better of these points/geometries. If the second point is preferred, the process will pick a new point in the same direction from the first point, to see if the improvement continues. This is repeated until what is deemed to be the best point for a given property, which could be a local or global optimum.

In other words, given a current set of parameters (e.g. as a parameter vector), the target function may be derived. Using the derivative, the process knows how to update the parameters (i.e. in which direction to update the parameter vector), such that the error decreases. For the present problem, most of the target functions cannot be derived analytically, meaning that numeric derivatives generally have to be used, which means the function is evaluated twice with slightly varied parameter vectors. This results in two function evaluations per parameter per iteration. In an average design process, the function must be evaluated millions of times. If for example every of those iterations requires several hours of FEM simulation (also called FEA), this is generally not feasible. Therefore, the present invention uses an inner optimization loop using function heuristics as will be described below.

In case of mixed real and integer target functions, mixed integer optimization techniques may be utilized. Alternatively, other mixed approaches may be utilized which use heuristics to determine the integer part and rely on standard optimization for the continuous variables. For finding an optimal solution, all constraints must be expressed in the form of residual functions giving a measure of the error amount. To trade between different error metric scales both, weighting and robust kernel functions may be used.

The successive function evaluations may be the same evaluation performed a large number of times. Alternatively, in some embodiments, the successive function evaluations may include multiple evaluation steps. As a first step, a first subset of the set of successive function evaluations may be based on at least one heuristic that provides estimates for the function evaluations. Especially those functions evaluations that involve expensive simulations, like FEM, can have very long evaluation times (ranging from a couple of hours up to days). Given that these operations are not differentiable, at least two evaluations may be required per parameter and iterations, which results in unacceptably long run-times. Accordingly, a two-stage approach to optimization is beneficial. Heuristics with varying accuracy offer fast evaluation during a first subset (e.g. the majority) of evaluations as part of an "inner loop". As a second step, finer grained and more accurate high-fidelity simulations like FEM may be used as part of an "outer loop" for better results. This provides fast feedback for the designer or engineer, while still reaching the overall accuracy that is required for the process.

The heuristic may be based on a digital model of the part of the sports article, wherein the digital model is based on the set of structural parameters. A digital model is a representation of the sports article to be manufactured that may be processed by a computer given a suitable algorithm.

The method may further comprise the step of creating the digital model, wherein the step of creating the digital model comprises: providing a mesh structure comprising mesh cells. These mesh cells may build up in a repeating pattern to form a framework that represents the part of the sports article to be manufactured. The mesh structure may be deformed, such that its outer boundary conforms to the shape of the part of the sports article to be manufactured.

The cells that make up the digital model are considered to each contain multiple actual elements that make up the part of the sports article to be manufactured. For example, when building upper reinforcement out of a large number of patches, a 2D cell containing a set number of patch elements may be used as an approximation for the individual patches. Similarly, a 3D cell containing a set arrangement of lattice beams may be used as an approximation for the individual beams when designing a midsole lattice.

Segmenting the part of the sports article into cells allows for a reduction of the sheer number of variables in the design and the optimization problem is simplified. The cells may share a common set of physical parameters that needs to be fixed by the designer/engineer or optimized in the optimization step. Instead of fixing and optimizing the physical parameters for every individual element in the entire sports article or a part thereof, a reduced set of parameters for a single (prototype) cell is determined and fixed or optimized. While this approach induces further parameters, like the type and number of cells, the total number of parameter is significantly reduced due to the sharing or parameters.

All of the parameters mentioned herein could fall into either the first group or the second group, depending on what the designer wanted to achieve. For example, if the aesthetics of the visible edges of a midsole lattice were the most important feature then the choice of the lattice family could fall into the first group along with positions of singularities.

Alternatively, if it more important to design a lattice that achieves a specific shearing resistance based on the weight of a particular athlete, then the lattice family may no longer be of particular concern and may become a parameter of the second group, while the conformity of the hexahedra cells may become a parameter of the first group in order to ensure that the resulting lattice is most likely to prevent shearing.

The mesh may comprise a first plurality of similar mesh cells. As described above, having similar cells allows to share physical parameters across cells.

The first plurality of similar mesh cells may comprise hexahedral cells. Hexahedral cells are the easiest to simulate and have nice visual properties due to their symmetry.

The mesh may comprise a second plurality of similar mesh cells. As described above, having similar cells allows for sharing of physical parameters across cells. Having two different cell types allows for adaptability of the cell type used with respect to the geometry of the sports article. For example, the first plurality of mesh cells could be used in locations which require less deformation of the cells to adapt to the shape of the sports article, whereas the second plurality of mesh cells could be used in the remaining locations.

The second plurality of similar mesh cells may comprise tetrahedral cells. When filling the volume of the sports article with cells, the cells on the outside generally tend to heavily deform. When using hexahedral cells, the cells will start to behave differently compared to a simulation in an undeformed state. Tetrahedral cells may desirable in this respect as their properties are not so prone to deformations.

The first plurality of similar mesh cells may be surrounded at least in part by the second plurality of mesh cells. As cell deformation is more distinct at the edges of the sports article and to be able to still have design freedom, a mixed approach with a first plurality of mesh cells (e.g. hexahedral cells) in the functional core and a second plurality of mesh cells (e.g. tetrahedral cells) around the core may be utilized.

As discussed above, each cell may be populated with a set number of smaller elements that make up the part of the sports article to be manufactured. For a 3D cell containing beams that make up a midsole lattice, there are constraints applied to how each cell is filled with beams. Each cell may be populated with a "lattice stencil". A stencil is understood as a pattern that is repeated across the cells in the sense of a prototype pattern. There are different lattice types with different properties, sometimes called lattice families. For example, if the part of the sports article is 3D-printed, the lattice stencil is defined by the beam structure inside a cell. The same lattice stencil is used for a plurality of cells (e.g. for all hexahedral cells or for all tetrahedral cells) to reduce the number of parameters. For example, instead of defining the beam structure globally(i.e. for the entire sports article), the beam structure may be defined by the lattice stencil for a single cell and then copied to a plurality of cells.

The usage of lattice stencils has several advantages. For example, it is possible to impose the restriction to allow only movements of the corners of the individual cells. The lattice within would then follow accordingly, but cannot be moved alone. This reduces the complexity in various ways. For a hexahedral-cell mesh, there are only eight points on each cell that may be moved, rather than moving every node of the lattice within. A single lattice stencil may include 40 or more nodes. In some embodiments, a single lattice stencil may include 20-100 nodes or a single lattice stencil may include 40-80 nodes. Therefore, restricting movement of the corners of cells only may greatly reduce the optimization compared to when every node of a lattice may be moved. As the lattice stencil or at least the lattice family may be the same across many cells, this allows for easier simulation and testing of predefined cells (e.g. cubes). The simulation results from (single) cubes may be used to find functional heuristics which may be used in the optimization step. Finally, different lattices may be populated into different cells leading to varying properties of the sports article.

In some embodiments, a second subset of the set of successive function evaluations may be based on exact function evaluations, wherein the function evaluations in the second subset are performed after the function evaluations in the first subset. The exact function evaluations in the second subset are part of the "outer loop" of the optimization process. Upon coming closer to a final product, the more accurate outer loop may be applied to get more accuracy and to steer the product towards a final geometry. Thus, these exact function evaluations are used to verify the heuristic functions evaluations of the inner loop.

The exact function evaluations may be obtained by a FEA. As mentioned, FEM is very accurate. Generally, FEM is a numerical method for solving engineering problems such as structural analysis, heat transfer, fluid flow, mass transport, and electromagnetic potential. The analytical solution of these problems generally requires the solution to boundary value problems for partial differential equations. The FEM formulation of the problem results in a system of algebraic equations. The method yields approximate values of the unknowns at discrete number of points over the domain, e.g. a volume. To solve the problem, it subdivides a large problem into smaller, simpler parts that are called finite elements. The simple equations that model these finite elements are then assembled into a larger system of equations that models the entire problem. FEM then uses variational methods from the calculus of variations to approximate a solution by minimizing an associated error function.

In some embodiments, a FEM may be used to simulate printing a lattice by a 3D printing process. The outcome of such a simulation may be whether a particular cell of the lattice is printable or not. This may dependent on the physical properties of the material and the geometry of the cell.

The FEA may be based on a production file, wherein the production file is based on the digital model. Thus, the FEA is able to control the quality of the fast inner loop. If, for example, the result of the FEA is that a midsole is not printable by a 3D printing process, the designer can change at least one parameter and/or constraint to eventually arrive at a printable design.

The step of manufacturing the part of the sports article may comprise using an additive manufacturing method. Additive manufacturing like 3D-printing allows for manufacturing of geometries and structures that may not be possible with conventional manufacturing methods like molding. In addition, as the entire design and manufacturing process is digital, the design and manufacturing time may be reduced.

The sports article may be a shoe and the part may be the midsole of the shoe. Midsoles not only have to fulfill a number of requirements including functional aspects including, but not limited to, cushioning, desired torsional stiffness, etc., but also design aspects. Therefore, as the number of parameters that need to be fixed and optimized is rather large, the method of the present invention may be applied to midsoles. In addition, midsoles offer potential for modern additive manufacturing techniques like 3D-printing.

The sports article may be a shoe and the part may be the upper of the shoe. The method of the present invention may also be applied to shoe uppers which have to fulfill similar requirements to those of the midsoles (i.e., functional and aesthetical). For example, the upper may be reinforced by patches and the method may be used to place the right amount of patches at the optimal locations. Thus, the step of manufacturing the part of the sports article may comprise providing a blank and placing at least one patch on the blank.

Another aspect of the invention is directed to a part of a sports article which is manufactured as described herein. A further aspect of the present invention is directed to a sports article comprising such a part.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following, only some possible embodiments of the invention are described in detail. It is to be understood that these exemplary embodiments may be modified in a number of ways and combined with each other whenever compatible and that certain features may be omitted in so far as they appear dispensable.

FIGS. 1A, 1B and 1C show an illustration of an exemplary method 101 according to the invention with respect to the manufacture of a midsole for a sports shoe by a 3D-printing process. It is to be understood that the present invention is neither limited to the manufacture of shoes nor to the usage of a particular manufacturing process.

FIG. 1A shows the types of considerations that may affect the design of the midsole to be manufactured. These types of constraints include, but are not limited to, design intent 102, functional goals 103, production constraints 104, and customer data 104. This list is exemplary only and not limiting. The design intent parameters 102 include, for example, design volume, design language, and thickness of the midsole. The design intent 102 will determine a first set of constraints input by a designer so that the end product looks roughly how they desired. The functional goals 103 include, for example, instep stiffness, functional stiffness, shearing resistance, and weight goals. At least one functional goal will be the objective function to be optimized as will be described below. The production constraints 104 include, for example, print platform attachments, beam angle limits, and resin flow limits. As will be described in more detail below, the production constraints 104 are the restrictions taken into account during the FEA (i.e., the outer loop) to assess whether a design is realistic once it has been optimized by heuristics (i.e., the inner loop). The customer data 105 includes, for example, foot scan, weight, sports type, pressure plot, and movement data.

Generally, in this example, equal attention is paid to the aesthetic design 102 and functional properties 103 required by the resulting midsole. Production constraints 104 are considered to assess whether it is physically possible to construct a certain midsole design. Customer data 105 may affect the functional properties required.

Figure 3A:
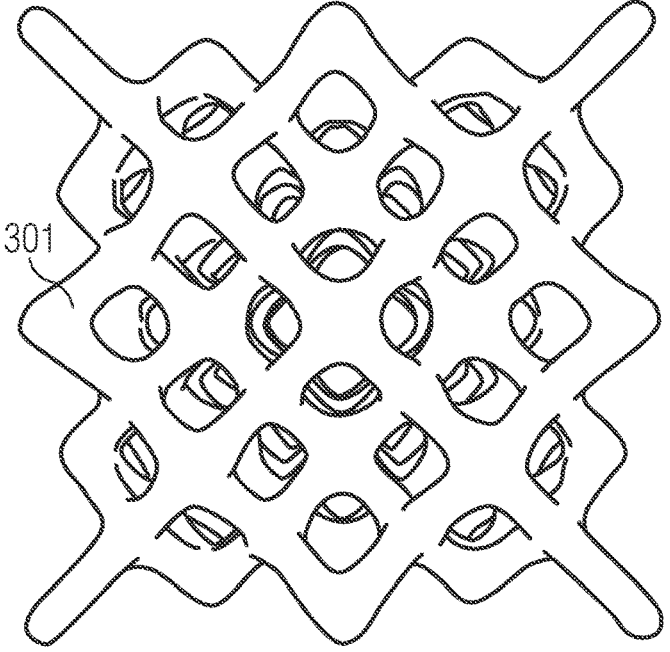
FIG. 3A is a top view of a beam structure used in a three-dimensional printing process, manufactured according to one of the methods described herein, according to certain embodiments of the present invention.
Figure 3B:
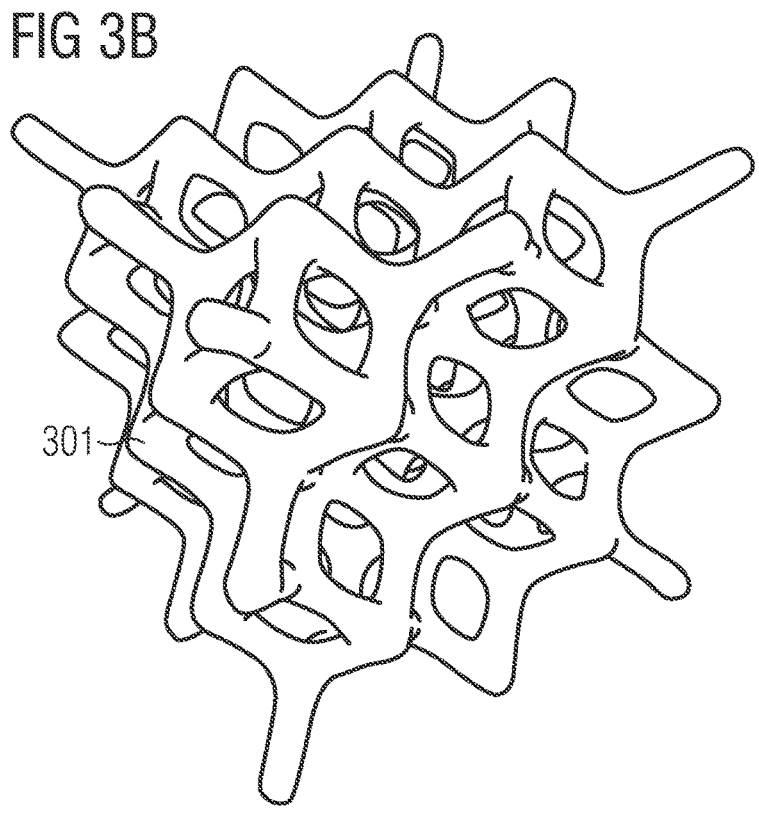
FIG. 3B is a perspective view of the beam structure of FIG. 3A according to certain embodiments of the present invention.

The exemplary parameters are input parameters to the general optimization problem 106. Printing a midsole with a non-linear elastic material in 3D is a challenging problem. To gain an advantage from this new technology, the midsole in this example is printed in the form of beam structures that are connected at nodes to form a lattice. Examples of such a beam structure are shown in FIGS. 3A and 3B. Using a beam structure allows local control over the functional properties because a very large number of beams are used to make up the full lattice, and the length, radius, and angle of each beam may be adapted to meet the desired functional properties. Additionally, a lattice-based midsole increases efficiency in terms of weight as it is not a solid midsole construction. Optimizing a problem of this scale however is a time and resource consuming task. When thinking about the design space of a midsole, beams have to be placed in a way that all the criterions from above are met. The space of solutions and parameters is very large. To add to this problem, the material used for in the 3D-printing process is non-linear and elastic. Moreover, it tends to buckle. Finally, during the 3D-printing process, the material adheres to a platform causing gravity forces to be present.

Therefore, a simplified optimization problem is set up and solved as will be described by way of FIGS. 1B and 1C. FIG. 1B shows the setup of the optimization problem. In a first step 110, all parameters are identified to be considered in the optimization problem. These are not individual parameters associated with a lattice. Instead, these parameters are associated with a mesh of cells that will be used to fill the midsole volume. Examples of parameters may include the number of cells in each direction, the position of transitions between different cell types, the location of cell nodes, aspect ratio, verticality, and lattice family.

A more complete, but non-limiting list of parameters is provided in the following: number of hexahedral cells in all three dimensions, position of singularities in the hexahedral mesh, location of the hexahedral cell nodes, location of the tetrahedral cell nodes (to be explained below), position of the hexahedral-to tetrahedral transition (to be explained below), conformity of the hexahedral cells (angles and side length), verticality of the hexahedral cells (relative to the bottom surface), aspect ratio of the hexahedral cells, square ratio of the hexahedral cells, target number of the hexahedral cells in all directions, and target cell type for aesthetic/ design language reasons.

The mentioned singularities are nodes within the cell mesh (i.e. corners where adjacent cells meet) that are irregular. These occur in transitional areas, such as at the transition between hexahedral cells and tetrahedral cells, at the edge of the midsole volume or at a point where the number of cells in a given direction is reduced or increased. These irregular nodes have an irregular appearance, and so may be hidden within the lattice or brought to the edge, depending whether a designer wants them to be seen or not.

In a step 120, the parameters identified in step 110 may be split into two groups. A set of constraints is determined for the parameters in the first group 121. The set of constraints is intended to achieve at least one objective function. Usually, a designer sets the values for the parameters in the first group 121 of parameters, as will be described in more detail below with respect to FIG. 1C. Thus, these parameters may be considered as boundary conditions for the optimization problem. In an example, the first group 121 of parameters may include the following parameters from the list of parameters above: conformity of the hexahedral cells (angles and side length), verticality of the hexahedral cells (relative to the bottom surface), aspect ratio of the hexahedral cells, square ratio of the hexahedral cells, target number of hexahedral cells in all directions, target cell type for aesthetic/design language reasons, target force displacement curve at multiple points in the midsole, target shearing resistance, bending stiffness of the midsole, and printability of the result.

It should be noted that this list is only exemplary and that at least one particular parameter may be included in the second group 122 of parameters or vice-versa.

The parameters in the second group 122 of parameters are left to be optimized in order to achieve the intended goal, i.e. an optimum for at least one objective function over the second group 122 of parameters needs to be determined. In an example, the second group 122 of parameters includes the following parameters from the list of parameters above: number of hexahedral cells in all three dimensions, position of singularities in the hexahedral mesh, location of the hexahedral cell nodes, location of the tetrahedral cell nodes (to be explained below), and position of the hexahedral-to tetrahedral transition.

Again, it should be noted that this list is only exemplary and that at least one particular parameter may be included in the first group 121 of parameters or vice-versa. Generally, distributing the parameters among the first group 121 and the second group 122 is at the designer's discretion.

In step 130 a design model is created. To reduce the dimensionality of the optimization problem the volume of the midsole may be filled with mesh cells, each cell being capable of containing a lattice stencil. The lattice stencil may be dictated by the designer, but it is also possible to include the specific lattice family in the second group 122 of parameters.

Figure 2C:
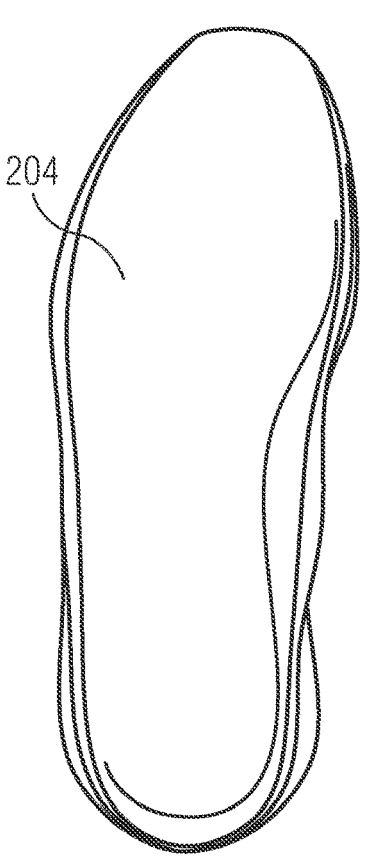
FIG. 2C is the plain midsole volume of FIG. 2B illustrated without the hexahedral mesh, according to certain embodiments of the present invention.

In some embodiments, a hexahedral space filling primitive is used. This means, the design volume, an example of which is shown in FIG. 2C, may be first filled with a hexahedral mesh 201 (e.g. cubes) as shown in FIG. 2B. To create this hexahedral mesh 201, a regular grid of 3D hexahedral elements (e.g. cubes) is created as illustrated in FIG. 2A. This mesh 201 may then be deformed such that it conforms to the given design volume 204 as shown in FIG. 2B. As a result, the outside 202 of the hexahedral mesh 201 may closely resemble the design volume 204, while on the inside 203, every cell should be as close as possible to a perfect cube. Given the deformation, this of course is only possible to a certain degree.

Then, a set of lattice stencils (different lattice types, with different properties, also known as lattice families) may be populated into these cells. Lattice families are groups of lattices, each suitable for populating one of the cells described above, that interface with each other. This means that at the edges of any given cell, the beams may all connect to the beams at the edge of an adjacent cell. The lattices in each cell align, even if the specific lattices used in each cell are different. To reduce the burden on the designer, a list of lattice stencils may be provided and then restricted to lattices within the same family. As different lattices have different properties, the designer may not be able to modify or move the lattice itself. Therefore, the system may be restricted to allow only movement of the hexahedral corner cells, more precisely the corners of each of the hexahedral cells that make up the volume 204 of the midsole. The lattice within follows accordingly but may not be moved alone.

Figure 4A:
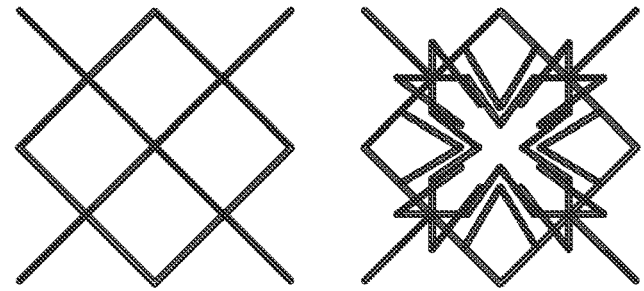
FIGS. 4A-4B are exemplary lattice stencils according to certain embodiments of the present invention.
Figure 4B:
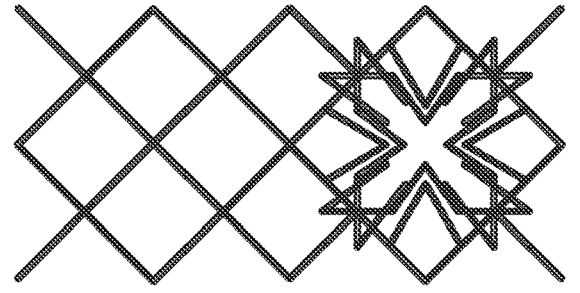

FIG. 4A shows exemplary lattice stencils from within the same family. FIG. 4B demonstrates that the lattice stencils shown in FIG. 4A are tileable as they are all part of the same family.

When conforming the mesh 201 to the geometry 204 of the midsole, the cells on the outside may be heavily be deformed as seen in FIG. 2B. This has disadvantages in terms of look and function, since the cells will start to behave differently compared to the simulation in an undeformed state. To be able to still have design freedom, a mixed approach with hexahedral cells in the functional core and tetrahedral cells around the outside is utilized in some embodiments.

Once the design model has been created in step 130 in FIG. 1B using the cell approach described above, the optimization process may be performed as outlined in FIG. 1C. In a first step 140, the designer sets constraints (i.e. boundary conditions) on the first group 121 of parameters. For example, the designer may set the target number of hexahedral cells in all directions mentioned in the above list of first group parameters to a specific integer value (e.g. "71").

The optimization problem tries to find values for the parameters in the second group 122 of parameters that give the best results based on the constraints entered by the designer for the first group 121 of parameters in step 140 of FIG. 1C. Additionally, to influence the final result, the designer can change the weight or importance of particular constraints relative to each other. Additionally, a designer can change certain target values (aspect ratios, force displacement curves, etc.)—i.e. can assign specific objectives for the lattice to achieve, otherwise known as "objective functions".

As shown in the above list, the constraints cover a wide range of aspects and the error metric can vary wildly. Also, the complexity of evaluation varies by orders of magnitude. The targets or objective functions placed on the parts of the sporting article being made that are assessed in a second stage involving FEM simulation (target force displacement, shearing, bending, printability) can have very long evaluation times (ranging from a couple of hours to several days). Given that these operations are not differentiable, at least two evaluations are required per parameter and iteration. This would result in very long run-times.

To solve this optimization problem, a two-stage optimization approach may be used. As part of an "inner loop", functional and production heuristics are may be used in step 150 in FIG. 1C to find the optimum values for the second group of parameters and, thus, to design an optimum mesh configuration. Functional heuristics are heuristics that are used to find an optimum for achieving a target function. Production heuristics are heuristics that provide values that are assumed to meet the production constraints. Together, these two forms of heuristics give a fast estimation for a structure that is both physically achievable and that provides the desired function.

An exemplary heuristics for the aspect ratio of the hexahedral cells is based on the fact that certain lattice types have their sweet-spot in a defined range of height to width ratios. Other heuristics include the linking of certain hexahedral cell configurations (size, aspect ratio, stacking height, etc.) to certain simulated mechanical properties. That way, finding the rough mechanical properties comes down to a simple database lookup. For printability a similar approach may be used where a machine learning system is trained to speed up the lookup from hours to seconds.

In step 160 in FIG. 1C the optimum mesh found in step 150 may be populated with the chosen lattice to create a production file which is later used in the FEA step 170. The FEA simulation runs a printability analysis on the full geometry of a midsole structure. In broad terms, the simulation analyzes the midsole in layers, as the midsole would be printed physically, and assesses the forces that affect each layer as the midsole builds up (e.g. due to gravity). Therefore, in some embodiments a full geometry is generated from the inner loop step 150 of the present method before the more thorough outer loop analysis 170 is performed.

For the creation of printable geometries in step 160, two sub-steps may be required: population of the hexahedral cells with the actual lattice and creating the actual volumetric information. In the first sub-step, tri-linear interpolation may be used to place the beams inside the hexahedral (or tetrahedral) cells. Thanks to the design of the lattice and the interpolation approach, the beams will match up at the cell borders. At this stage every beam may only consists of a start point, end point, and radius.

This has to be transformed into a volumetric representation. For every volume element of the later print volume the decision is made if this element is supposed to be solid or not.

In some embodiments, both of these sub-steps are performed not only for production file generation but at multiple points during optimization. For example, the FEA based printability analysis runs on the full print geometry. The FEA based functional simulation may either run on the beam or full mesh representation.

Once the production file has been created in step 160, a FEA may be used to validate the lattice design as part of an "outer loop" for better results (step 170 in FIG. 1C). In some embodiments, the function evaluations of the outer loop are considered exact. Therefore, the two-stage approach may provide the possibility to get fast feedback for the designer, while still reaching the overall accuracy that is required for the process.

In some embodiments, the FEA in step 170 checks the optimum values that have been found for the initial boundary conditions set by the designer which may be a local minimum.

It is possible that the method loops back in step 180 to the first step 140 to allow the designer to input alternative boundary conditions at least one time. In this way, a global minimum may be found. Equally, the method may loop back to earlier steps if the FEA reveals that the proposed lattice is not printable or does not meet the functional goals etc.

In summary, and as outlined in the flow-chart of FIG. 1C, a two-stage optimization approach may be used with a fast inner loop and a slow but more accurate outer loop. The inner loop may utilize the described heuristics, the outer loop may use the full FEM simulation. Running only the fast inner loop is a good tool during an iterative design phase. In some embodiments, upon coming closer to a final product, the more accurate outer loop is applied to get more accuracy and to steer the product towards a final geometry.

As mentioned above, according to some embodiments, the method may be used for other manufacturing techniques. Another example is the placement of patches on a shoe upper. For example, the physical parameters may include, for example, tensile strength, bending stiffness, shear strength, etc. The designer may input constraints such as the coarse location and/or orientation of the patches, the number of patches, etc. In some embodiments, the manufacturing method can then be used to optimize a set of physical parameters given the constraints of the designer to arrive at an optimal upper which can then be manufactured for example by an automated patch placement process involving robots.

In the following, further examples are described to facilitate the understanding of the invention:

1. A method of manufacturing at least a part of a sports article, comprising the steps:

a. determining a set of physical parameters of the sports article, the set comprising a first group and a second group;

b. determining a set of constraints for the first group of the physical parameters, wherein the set of constraints is intended to achieve at least one objective function c. determining an optimum for the at least one objective function, wherein the optimum is determined by optimizing the second group of physical parameters; and d. manufacturing the part of the sports article according to the set of constraints and the second group of optimal physical parameters 2. The method of example 1, wherein the step of determining an optimum of the at least one objective function comprises the step of using an iterative process that estimates the optimal physical parameters of the second group by a set of successive function evaluations of the at least one objective function.

3. The method of example 2, wherein a first subset of the set of successive function evaluations is based on at least one heuristic that provides estimates for the function evaluations.

4. The method of example 3, wherein the heuristic is based on a digital model of the part of the sports article, wherein the digital model is based on the set of physical parameters.

5. The method of example 4, further comprising the step of creating the digital model, wherein the step of creating the digital model comprises:

providing a mesh structure comprising mesh cells; and deforming the mesh structure, such that its outer boundary conforms to the shape of the part.

6. The method of example 5, wherein the mesh comprises a first plurality of similar mesh cells.

7. The method of example 6, wherein the first plurality of similar mesh cells comprises hexahedral cells.

8. The method of example 6 or example 7, wherein the mesh comprises a second plurality of similar mesh cells.

9. The method of example 8, wherein the second plurality of similar mesh cells comprises tetrahedral cells.

10. The method of example 8 or example 9, wherein the first plurality of similar mesh cells is surrounded at least in part by the second plurality of mesh cells.

11. The method of one of examples 5-10, wherein each mesh cell is populated with a lattice stencil that forms a portion of the part of the sports article to be manufactured.

12. The method of one of examples 3-11, wherein a second subset of the set of successive function evaluations is based on exact function evaluations, wherein the function evaluations in the second subset are performed after the function evaluations in the first subset.

13. The method of example 12, wherein exact function evaluations are obtained by a finite element analysis, FEA.

14. The method of one of examples 4-13, wherein the finite element analysis is based on a production file, wherein the production file is based on the digital model.

15. The method of one of examples 1-14, wherein the step of manufacturing the part of the sports article comprises using an additive manufacturing method.

16. The method of one of examples 1-15, wherein the sports article is a shoe and the part is the midsole of the shoe.

17. The method of one of examples 1-15, wherein the sports article is a shoe and the part is the upper of the shoe.

18. The method of example 17, wherein the step of manufacturing the part of the sports article comprises:

providing a blank;

placing at least one patch on the blank.

19. A part of a sports article which is manufactured according to one of examples 1-18.

20. A Sports article comprising a part according to example 19.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method of manufacturing at least a part of a sports article, comprising the steps:

a. determining a set of physical parameters of the sports article, the set comprising a first group and a second group that is different from the first group, wherein the first group comprises (i) an indication of a type of three-dimensional lattice family selected from a plurality of types of three-dimensional lattice families, wherein the type of three-dimensional lattice family comprises an indication of a lattice structure of the part of the sports article with two or more intersecting lattice planes and (ii) an indication of a number of three-dimensional voxels into which a printable volume of the part of the sports article is divided, and wherein the first group of the set of physical parameters is used to define a set of constraints;

b. determining the set of constraints for the first group of the physical parameters, wherein at least one objective function is achievable via the set of constraints;

c. determining an optimum for the at least one objective function, wherein the optimum is determined by optimizing the second group of physical parameters, wherein the step of determining the optimum of the at least one objective function comprises a step of using an iterative process that estimates the optimal physical parameters of the second group by a set of successive function evaluations of the at least one objective function, wherein a first subset of the set of successive function evaluations is based on at least one heuristic that provides estimates for the function evaluations, wherein a second subset of the set of successive function evaluations is based on printability evaluations obtained by a finite element analysis, wherein the second subset of the set of successive function evaluations are performed after the first subset of successive function evaluations;

d. creating a digital model by:

providing a mesh structure comprising mesh cells; and deforming the mesh structure, such that an outer boundary conforms to a shape of the part of the sports article; and e. manufacturing the part of the sports article according to the set of constraints, the second group of optimal physical parameters, and the digital model.

2. The method of claim 1, wherein the heuristic is based on the digital model of the part of the sports article, wherein the digital model is based on the set of physical parameters.

3. The method of claim 1, wherein the mesh structure comprises a first plurality of mesh cells.

4. The method of claim 3, wherein the first plurality of mesh cells comprises hexahedral cells.

5. The method of claim 3, wherein the mesh structure comprises a second plurality of mesh cells, wherein the first plurality of mesh cells are different from the second plurality of mesh cells.

6. The method of claim 5, wherein the second plurality of mesh cells comprises tetrahedral cells.

7. The method of claim 5, wherein the first plurality of mesh cells is surrounded at least in part by the second plurality of mesh cells.

8. The method of claim 1, wherein each mesh cell is populated with a lattice stencil that forms a portion of the part of the sports article to be manufactured, wherein the lattice stencil comprises a lattice structure of the type of three-dimensional lattice family selected from the plurality of types of three-dimensional lattice families.

9. The method of claim 1, wherein the finite element analysis is based on a production file, wherein the produc-tion file is based on the digital model of the part of the sports article, wherein the digital model is based on the set of physical parameters.

10. The method of claim 1, wherein the step of manufac-turing the part of the sports article comprises using an additive manufacturing method.

11. The method of claim 1, wherein the sports article is a shoe and the part is a midsole of the shoe.

12. The method of claim 1, wherein the sports article is a shoe and the part is an upper of the shoe.

13. The method of claim 12, wherein the step of manu-facturing the part of the sports article comprises:

providing a blank; and placing at least one patch on the blank.

14. A part of a sports article which is manufactured according to claim 1.

* * * * *